United States Patent [19]

Hayek et al.

[11] Patent Number: 4,858,592
[45] Date of Patent: Aug. 22, 1989

[54] BURNER SYSTEM

[75] Inventors: George W. Hayek, Seattle; Amos J. Brown, Bothell; John R. Hamblin, Seattle; Donald M. Robinson, Snohomish, all of Wash.

[73] Assignee: Belshaw Bros., Inc., Seattle, Wash.

[21] Appl. No.: 16,761

[22] Filed: Feb. 20, 1987

[51] Int. Cl.⁴ ............................................. A47J 27/00
[52] U.S. Cl. ..................................... 126/373; 126/391; 126/390
[58] Field of Search ............... 126/390, 391, 373, 378, 126/91 A; 431/351

[56]  References Cited

U.S. PATENT DOCUMENTS

| 2,047,471 | 7/1936 | Hepburn et al. | 126/91 A |
| 2,433,134 | 12/1947 | Long | 126/391 |
| 2,491,000 | 12/1949 | Cone | 126/391 |
| 2,655,944 | 10/1953 | Proehl | 126/91 A |
| 2,712,308 | 7/1955 | Keating | 126/391 |
| 3,060,922 | 10/1962 | Wilson | 126/391 |
| 3,185,143 | 5/1965 | Wilson | 126/91 A |
| 3,313,288 | 4/1967 | Aho | 126/391 |
| 3,970,072 | 7/1976 | Chipchase | 126/391 |
| 3,990,433 | 11/1976 | Keating | 126/391 |
| 4,157,241 | 6/1979 | Samuelson | 126/91 A |
| 4,289,111 | 9/1981 | Duncan et al. | 126/391 |
| 4,481,873 | 11/1984 | Keating | 126/391 |
| 4,602,612 | 7/1986 | Schwizer | 126/391 |
| 4,651,714 | 3/1982 | Granberg | 126/391 |

Primary Examiner—Larry Jones
Attorney, Agent, or Firm—Seed & Berry

[57] ABSTRACT

A burner for a hot deep-fat fryer for doughnuts or the like has a restricted opening for entrance of secondary combustion air. The heating tube in which the burner emits its flame is provided with a series of V-shaped, elongated baffles.

11 Claims, 2 Drawing Sheets

BURNER SYSTEM

DESCRIPTION

1. Technical Field

This invention pertains to hot fat or oil fryers of the type used for cooking doughnuts.

2. Background Art

Small hot oil tanks for doughnut fryers have conventionally been provided with a series of heating pipes immersed in the oil at the bottom of the fryer tank. A conventional gas burner is connected to a gas inlet pipe and has its opposite end connected within the heating pipes in the frying tank. The prior art burners performed poorly due to excessive secondary air that entered between the burner and the pipe. The excessive air flowing through the burner caused an inefficient flame and moved the hot products of combustion too quickly through the heating pipes. The residence time of the heat within the heating pipe was foreshortened in the prior art fryers tank due to the chimney effect of the heating pipe and exhaust stack connected at the discharge end of the heating pipes and the large secondary air opening.

The chimney effect of the exhaust stack and heating pipe that contributed to the acceleration of the flame and heated products of combustion through the heating pipe also reduced the amount of radiant heat that could be transferred to the heating pipe and thus to the oil in the tank. This loss of residence time meant that more gas had to be supplied than was necessary, start-up of the fryers in the morning had to begin earlier in order to reach operating temperature when the start of production was needed, and new reheating between production runs took longer. Tank cooling incurred between the time the burners were firing was excessive due to the chimney effect.

DISCLOSURE OF THE INVENTION

It is an object of this invention to provide an improved burner system for a deep fat fryer for a doughnut frying machine.

It is another object of this invention to provide an improved burner system which limits secondary air and produces a hotter, more efficient flame.

Basically, these objects are obtained by placing a nozzle insert within the burner to limit the amount of secondary air that can enter the burner and mix with the flame. Secondly, the gap between the outer diameter of the burner and the inner diameter of the heat pipe in which the burner is mounted is closed by a ring which has openings admitting only a limited amount of secondary air from outside the burner to mix with the flame. Preferably, the openings are located radially inwardly next to the burner so that the air is emitted in close proximity to the flame emanating from the burner. This inward location for introducing the secondary air provides increased turbulence with the flame and better mixing of the air with the products of combustion of the primary flame. The small openings, combined with the negative pressure caused by the chimney effect of the downstream burner pipe and stack, create a greatly increased velocity of secondary air mixing with the flame. This higher velocity of entering secondary air also produces better mixing.

The flame with this controlled secondary air is the shape and color of a blowtorch type flame, being quite blue in color and of a greater heat than in the prior art.

Furthermore, since the amount of secondary air is controlled, the chimney effect of the heat pipe and stack is reduced so that the flame's products of combustion have a longer residence time when moving through the heating pipe than in the prior art. This results in a greater transfer of heat from the products of combustion to the oil in the tank.

The advantages of this system are that it takes less time to reach operating temperature in the oil from cold start-up in proper cooking temperature. Less gas is consumed to produce the same amount of heat. Since less air is coming in through the secondary inlet ports, less air passes through the tube, leaving the hot products of combustion residing in the tube for a longer period of time. As a result, more heat goes into the tank rather than up the stack. The fryer tank holds the heat longer between heating cycles as the airflow in the heat tube is closed off by the rings on the burners.

It is estimated that the efficiency of these burners went from approximately 42% of the BTUs resulting in heating to about 65% of the BTUs resulting in heating. Still another advantage is that recovery time, that is, the time necessary to return the tank to its proper cooking temperature after a cycle of doughnuts has been cooked, is much faster, so that a larger number of doughnuts can be placed through the fryer in a fixed amount of time.

A second feature of the invention is the use of baffles in the heat pipe to increase the amount of heat taken from the products of combustion and transmitted to the oil in the fryer tank. Preferably, these baffles are in the form of a series of "V"- or fan-shaped metal plates that run lengthwise along the heating pipe. The baffles are V-shaped to radiate heat upwardly to the tank and to provide reflection surfaces that reflect the heat upwardly into the tank. It is believed that these baffles add about a 5% increase in efficiency to the heat transfer process from the longer radiation and the increased reflection.

BEST MODE FOR CARRYING OUT THE INVENTION

Figure 1:
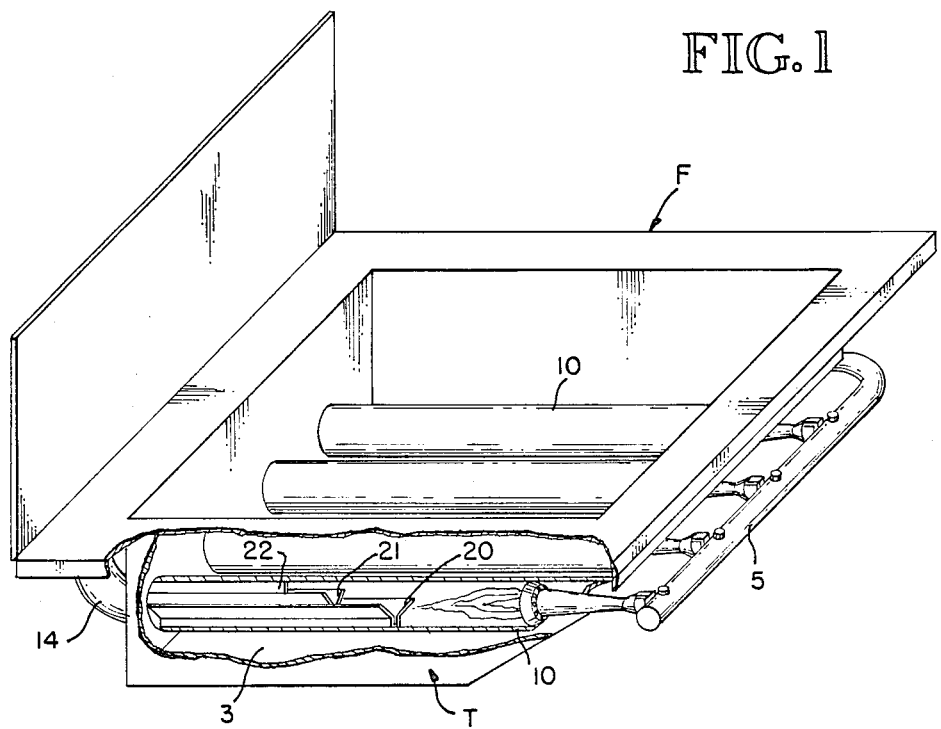
FIG. 1 is an isometric of a doughnut fryer with parts broken away for clarity.
Figure 2:
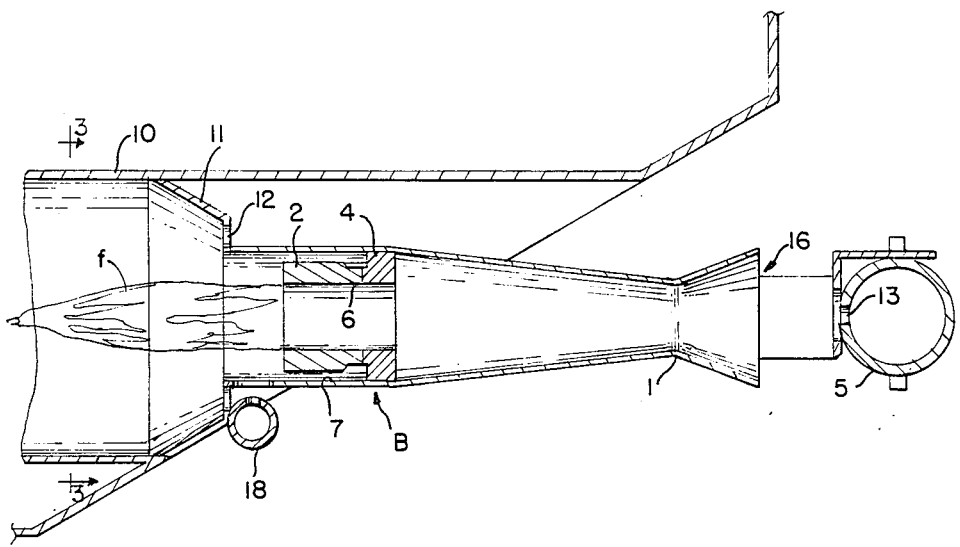
FIG. 2 is a fragmentary section of the fryer shown in FIG. 1.
Figure 3:
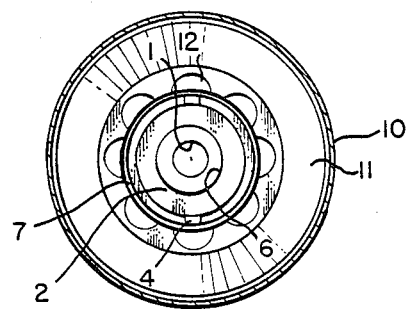
FIG. 3 is a section taken along line 3—3 of FIG. 2.
Figure 4:
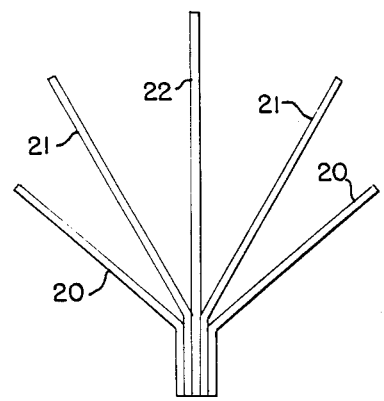
FIG. 4 is an end elevation of the baffle shown in FIG. 1.

As best shown in FIG. 1, a fryer kettle F having a tank T has a series of heat pipes 10 spaced along the bottom of the tank. The tank will be filled with cooking fat or oil, with the heat transferred from the pipes 10 used to bring the oil up to a cooking temperature for cooking doughnuts or the like. The pipes are connected to a vertical stack 14, as is conventional.

Each of the pipes is provided with a burner B that is connected to a common gas pipe 5. Gas is emitted from the gas pipe 5 through the venturi 1 of the burner where the gas mixes with primary air 16 coming in through the entrance end of the burner. A pilot gas tube 18 ignites the mixed gas and primary air to create a flame f at the entrance to the heating pipe 10.

The burner is provided with a nozzle insert 2 in the form of a ring held by two diametrically spaced spacers 4. The nozzle has an inner opening 6 and a gap 7 formed between the outside diameter of the ring 2 and the inside diameter of the burner. The sizes of the inner opening 6 and the gap 7 are sized by experimentation. These sizings are a function of the size of the orifice 13 in the gas pipe, at a normal gas pressure of 3½-inch water column, and the relative areas of the openings 6 and 7. One preferred embodiment utilized an inner opening 6 of ½-inch diameter, and an outside diameter of 0.985 inch for the dimensions of the insert 2. In the preferred embodiment described, the diameter of the inside wall of the burner B is 1-3/16 inch at the location surrounding the ring 2.

The remaining details of the nozzle are well known.

As the flame f formed from the primary air and the gas exits the nozzle 2, it is still rich in unburned gas. Secondary air is then introduced to mix with the gas and bring the flame up to a higher temperature with complete combustion.

It is a unique feature of this invention that secondary air is admitted through a set of half holes or orifices 12 provided in a ring 11. In a preferred embodiment, eight half-holes 12, each of 5/16-inch diameter, were in the ring 11. The half-holes have a curved diameter adjacent or coincident to the outside wall of the burner. The ring 11 closes off the gap between the burner and the heating pipe so that only air admitted through the orifices 12 reaches the flame F. In the alternative, a continuous slit orifice could be used in place of the separated orifice.

The orifices 12 are located at the inner edge of the closed ring 11 so they are closely adjacent the flame exiting from the burner. This causes the secondary air which is now admitted at a great velocity to mix directly with the flame and the unburned gas to achieve better mixing and more complete combustion in the heat pipe. Furthermore, since the amount of secondary air is limited the products of combustion move more slowly through the heat pipe giving off more of their heat during passage through the heat pipe. After the burners are shut down, for example, the heat also stays longer in the heat pipe, since there is less secondary air flushing through the heat pipe to cause cooling. The location and sizing of the secondary air orifices 12 thus increases the efficiency of the burners.

A second unique feature is the use of V-shaped metal baffles 20, 21 and 22 along the length of the heat pipe. Baffle 20 runs approximately two-thirds of the length of the heating pipe, starting near the termination of the flame F. Baffles 21 and 22 are cut back respectively, as shown in FIG. 1. The products of combustion heat the baffles and are slowed down during their movement through the heat pipe. The heated baffles radiate energy upwardly into the tank. The V shape of the baffles causes any reflected radiant waves to bounce upwardly again into the tank. The baffles add about 5% to the efficiency of the heat transfer process, both in the use of radiation and reflection.

While the preferred embodiments of the invention have been illustrated and described, it should be understood that variations will be apparent to one skilled in the art. Accordingly, the invention is not to be limited to the specific embodiments illustrated in the drawing.

What is claimed:

1. A burner system for a doughnut fryer having a tank, at least one heat pipe having an inner wall and an outer wall and located in the bottom of the tank, a stack connected to a discharge end of the heat pipe, a burner connected to the inlet end of the heat pipe and a gas pipe connected to the burner, comprising:

said burner being held within the heat pipe and having an outside surface spaced from the inner wall of the heat pipe, forming a gap therewith, the burner having a discharge end and inner and outer walls, a nozzle insert located within the burner and spaced from the inner wall of the burner, a primary atmospheric air opening located at the upstream end of the burner in the direction of airflow upstream of the nozzle insert, a gas inlet separate from the primary atmospheric air opening located at the upstream end of the burner upstream of the nozzle insert, the nozzle insert forming a restricted orifice for preventing burning of the gas and air upstream of the nozzle insert, and a closure ring closing the gap between the heat pipe inner wall and the burner outer wall, said closure ring provided with a secondary air opening located solely radially outward of the burner outer wall in close proximity to the burner outer wall, and downstream from the nozzle insert for admitting a limited amount of secondary air into the heat pipe and into the flame at the discharge end of the burner.

2. The burner system of claim 1, said opening in said closure ring including a plurality of equidistantly spaced holes adjacent the outer wall of the burner.

3. The burner system of claim 2, said openings being half-holes having a curved diameter coincident to the outside surface of the burner.

4. The burner of claim 1, said nozzle insert joined to said inner wall of the burner by a pair of spacers, the burner having a venturi upstream of the nozzle insert, and the gas pipe connected to the burner upstream of the venturi.

5. A burner system for a doughnut fryer having a tank, a least one heat pipe having an inner wall having upper and lower internal surfaces and located in the bottom of the tank, a stack connected to a discharge end of the heat pipe, and a burner connected to an inlet end of the heat pipe, the improvement comprising:

an elongated baffle lying lengthwise in the heat pipe between the burner and the stack, said baffle including at least two upwardly opening, continuously V-shaped deflectors for directing the heat primarily upwardly to heat the upper internal surface of the heat pipe more than the lower internal surface of the heat pipe, said first deflector having a wider angle than said second deflector, said second deflector starting lengthwise further downstream in said heat pipe than said first deflector.

6. The burner system of claim 5, said baffle including a third deflector, said third deflector being vertical and starting lengthwise downstream in said heat pipe further than said second deflector.

7. A burner system for a doughnut fryer having a tank, at least one heat pipe having an inner wall having upper and lower internal surfaces and located in the bottom of the tank, a stack connected to a discharge end of the heat pipe, and a burner connected to an inlet end of the heat pipe, the improvement comprising:

an elongated baffle lying lengthwise in the heat pipe between the burner and the stack, said baffle including an upwardly opening, continuously V-shaped deflector for directing the heat primarily upwardly to heat the upper internal surface of the heat pipe more than the lower internal surface of the heat pipe, said elongated baffle further including a first V-shaped deflector having a vertical base and upwardly and outwardly diverging deflector surfaces, a second V-shaped deflector having a vertical base fitted within the vertical base of said first V-shaped deflector, and upwardly and outwardly diverging deflector surfaces diverging at less of an angle than said deflector surfaces of said first deflector, and a third deflector having a single vertical fin fitted within the vertical base of said second deflector and extending upwardly beyond either said first or second deflector.

8. A burner system for a doughnut fryer having a tank, at least one heat pipe having an inner wall having upper and lower internal surfaces and located in the bottom of the tank, a stack connected to a discharge end of the heat pipe, a burner connected to the inlet end of the heat pipe, and a gas pipe connected to the burner, the improvement comprising:

the burner being located within the heat pipe and forming a gap therebetween, the burner having an upstream end in the direction of air and gas flow and a downstream end spaced from said upstream end, a primary atmospheric air inlet opening at the upstream end of the burner, a gas inlet separate from the primary atmospheric air opening located at the upstream end of the burner, a nozzle insert having an orifice, said nozzle insert being downstream of the primary atmospheric air opening and the gas inlet, a closure ring at the downstream end of the burner closing the gap and having at least one secondary air opening located solely radially outward and adjacent the downstream end of the burner for admitting secondary air into the heat pipe, said secondary air opening being of restricted size to limit the amount of secondary air admitted, a baffle located downstream of the burner in the heat pipe, said baffle including at least one elongated, upwardly opening, V-shaped deflector positioned lengthwise in said heat pipe for directing the heat primarily upwardly against the internal surface of the heat pipe more than the lower internal surface of the pipe.

9. The burner system of claim 8, said baffle including a second upwardly opening V-shaped deflector lying above said first deflector and beginning lengthwise downstream of said first deflector.

10. The burner system of claim 9, said baffle including a third deflector, said third deflector having a single vertical fin lying above said second deflector and beginning downstream of said second deflector.

11. The burner system of claim 8, said opening in said closure ring including a plurality of equidistantly spaced apertures surrounding said burner.

* * * * *